US008887561B2

(12) United States Patent
Lemineur

(10) Patent No.: US 8,887,561 B2
(45) Date of Patent: Nov. 18, 2014

(54) METHOD FOR ESTIMATING THE DYNAMIC LOAD BORNE BY A VEHICLE TIRE

(75) Inventor: Vincent Lemineur, Clemont-Ferrand-Cedex 9 (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/807,192

(22) PCT Filed: Jul. 1, 2011

(86) PCT No.: PCT/EP2011/061099
§ 371 (c)(1),
(2), (4) Date: Jan. 25, 2013

(87) PCT Pub. No.: WO2012/007296
PCT Pub. Date: Jan. 19, 2012

(65) Prior Publication Data
US 2013/0125639 A1    May 23, 2013

(30) Foreign Application Priority Data
Jul. 13, 2010   (FR) ...................... 10 55696

(51) Int. Cl.
*G01M 17/02* (2006.01)
*B60C 23/00* (2006.01)
*B60C 23/04* (2006.01)
*G01G 19/08* (2006.01)

(52) U.S. Cl.
CPC ............... *G01M 17/02* (2013.01); *B60C 23/04* (2013.01); *G01G 19/08* (2013.01)

USPC ............................................. 73/146; 340/442

(58) Field of Classification Search
None
See application file for complete search history.

(56) References Cited

U.S. PATENT DOCUMENTS

| 5,569,848 | A  | * | 10/1996 | Sharp ........................... 73/146.2 |
| 6,575,023 | B2 | * | 6/2003 | Ohashi et al. ................... 73/146 |
| 6,748,798 | B2 | * | 6/2004 | Oshiro et al. ................... 73/146 |
| 6,907,327 | B2 | * | 6/2005 | Sugisawa ..................... 701/32.9 |
| 6,917,864 | B2 | * | 7/2005 | Oshiro et al. ................. 701/32.9 |

(Continued)

OTHER PUBLICATIONS

International Search Report (PCT/ISA/210) issued on Aug. 5, 2011, by the European Patent Office as the International Searching Authority for International Application No. PCT/EP2011/061099.

(Continued)

*Primary Examiner* — Lisa Caputo
*Assistant Examiner* — Jermaine Jenkins
(74) *Attorney, Agent, or Firm* — Dickinson-Wright PLLC

(57) ABSTRACT

The invention relates to a method for estimating the dynamic load borne by a tire of a vehicle running along over a given period, whereby the pressure is measured during the period, at each pressure measurement point, the pressure, known as the reference pressure, of the same tire subjected to a load that is constant and known per time interval is determined, and the variation in load is calculated from the difference between the measured pressure and the pressure, known as the reference pressure, and from a model of the tire devised beforehand and that relates a variation in load to a variation in pressure.
The invention also proposes a method for estimating the load borne by a tire.

6 Claims, 5 Drawing Sheets

(56) References Cited

U.S. PATENT DOCUMENTS

Figure 1:
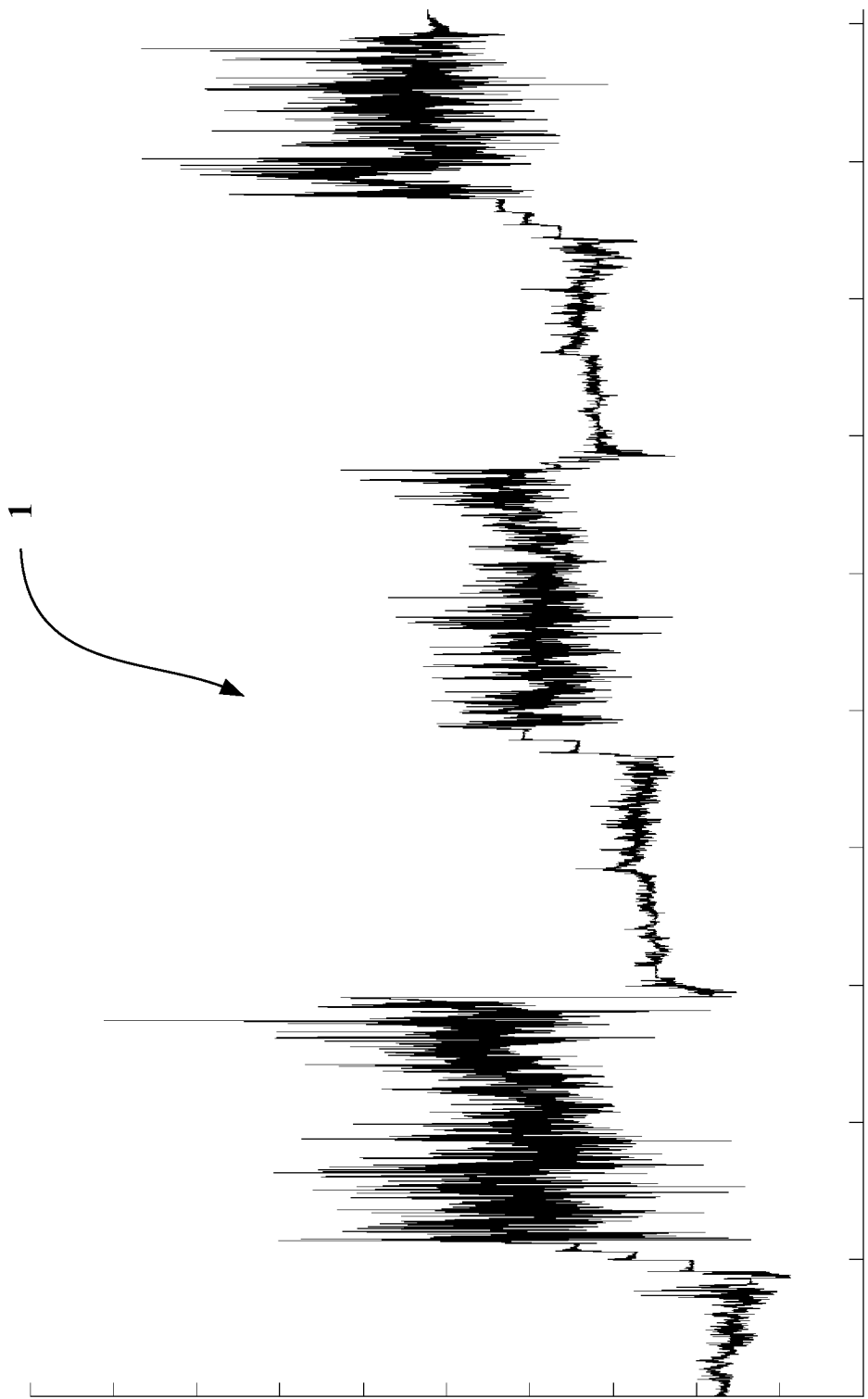

| | | | |
|---|---|---|---|
| 6,940,399 B2 * | 9/2005 | Tominaga et al. | 340/444 |
| 7,032,442 B2 * | 4/2006 | Yanase | 73/146 |
| 7,301,444 B2 * | 11/2007 | Matsuura | 340/442 |
| 7,305,318 B2 * | 12/2007 | Kitano | 702/148 |
| 7,707,876 B2 * | 5/2010 | Miyoshi | 73/146 |
| 2005/0030170 A1 * | 2/2005 | Rieck et al. | 340/443 |
| 2007/0017289 A1 * | 1/2007 | Sakamoto | 73/514.16 |
| 2007/0204685 A1 | 9/2007 | Corniot | |
| 2010/0063669 A1 | 3/2010 | Fink et al. | |
| 2010/0180677 A1 | 7/2010 | Katou | |

OTHER PUBLICATIONS

Search Report issued on Feb. 18, 2011, by the French Patent Office for Application No. 1055696.

Written Opinion issued on Jul. 13, 2010, by the French Patent Office for Application No. 1055696.

* cited by examiner

METHOD FOR ESTIMATING THE DYNAMIC LOAD BORNE BY A VEHICLE TIRE

The invention relates to a method for estimating the dynamic load borne by a tire of a vehicle running along over a given period. The invention also proposes a method of estimating the load borne by the said tire.

Although not restricted to such applications, the invention will be described more specifically with reference to tires intended to be fitted to vehicles of the dumper type. A dumper is a piece of "earthmover" equipment intended to carry heavy loads, and which runs around in quarries or mines.

These vehicles usually have a steered front axle assembly comprising two steered wheels and a rear axle assembly, usually rigid, comprising four driven wheels arranged in pairs on each side. An axle assembly is defined as an assembly of elements providing the fixed structure of the vehicle with ground contact.

In the case of such vehicles, notably those intended to be used in mines or quarries for transporting loads, problems with access and demands on productivity are forcing the manufacturers of these vehicles to increase their load-bearing capability. It follows that the vehicles are becoming increasingly large and therefore increasingly heavy themselves and able to transport increasingly heavy loads. The current mass of such vehicles may be as much as several hundred tonnes and the same is true of the load to be transported; the overall mass may be as much as 600 tonnes.

Because the load-carrying capability of the vehicle is related directly to that of the tires, the tire design has to be suited to these evolutions in order to supply tires capable of meeting the demands of use.

It is therefore desirable to have a better understanding of the use to which these tires are put, and more particularly of the loads they have to bear in use. These loads are related firstly to the load being transported and secondly to the use made of the vehicle and more specifically to the nature of the ground and to the path of the routes taken by the said vehicle.

Awareness of these loads may allow a better understanding of the origin of damage sustained by a tire and may even help with the actual design of the tires.

Specifically, current demands are still towards an increase in the load-carrying capability of these machines, the various parameters listed hereinabove leading tire designers to optimize the said tires notably to take account of the use to which these tires are put.

There are various methods already in use for determining the load borne by each of the tires of the vehicle.

A first method currently used is to measure the pressure in the suspension elements of the vehicle. This pressure is directly related to the load borne by the suspension element. However, friction and damping within these suspension elements distort the estimate that can be made of the loads actually being borne, particularly the dynamic loads. Further, and particularly as far as the rear axle assembly is concerned, it is almost impossible to define with precision the distribution of load between the various tires, particularly since there are twinned wheels on either side of the chassis.

Another known method for determining the load borne by the tire is to measure a ride height, for example using an ultrasound or even laser telemeter, and from this deduce the deflection of the said tire, the said deflection being related directly to the load and to the pressure. Such a measurement, if the inflation pressure is known, is actually a reflection of the load provided that the tire is running along flat ground. However, running along a track consisting of loose ground and/or along a track that is rutted or stony completely disrupts the interpretation of the measurement. Specifically, because these devices are usually positioned in an offset manner on the side of the tire, the measurement is distorted by local variations in ground height. Further, the use of such measurement is very tricky because the measurement systems are sensitive to the measurement conditions, and dust and temperature in particular may disturb the measurements.

Another method is to consider that the inflation air can be likened to a perfect gas and therefore satisfies the relationship: $p.V=n.R.T$, which formalizes a relationship between the pressure p, the volume V and the temperature T, n being the number of moles of gas and R being the universal gas constant for a perfect gas. The tire deflection, which is related to the load borne by the tire, leads to a variation in the internal volume of the tire. The measurements of pressure and temperature in the tire thus make it possible to deduce the variations in volume thereof and therefore the variations in load borne by the tire. It has been found that inserting a temperature sensor into the tire cavity is not always easy, particularly because of the curvature of the valves. Further, the size of dumper tires leads to inconsistencies in the temperatures within the tire cavity. Specifically, there are relatively great air temperature gradients associated with the use of these tires. On the one hand, during stationary phases the air cannot be constantly agitated and on the other hand, there are very significant exchanges of heat near the rim and of the tire.

The inventors have thus set themselves the task of providing an estimate of the load borne by tires during running that is more precise and/or easier to perform than those currently available using the methods mentioned earlier.

According to the invention, this objective has been achieved using a method for estimating the dynamic load borne by a tire of a vehicle running along over a given period, whereby the pressure is measured during the period, at each pressure measurement point, the pressure, known as the reference pressure, of the same tire subjected to a load that is constant and known per time interval is determined, and at each pressure measurement point, the variation in load is calculated from the difference between the measured pressure and the reference pressure and from a model of the tire devised beforehand and that relates a variation in load to a variation in pressure.

Within the meaning of the invention, the dynamic load is likened to the variation in load that the tire experiences during running.

A time interval advantageously corresponds to a laden state of the vehicle and therefore to a constant static load carried by each of the tires.

Within the meaning of the invention, the static load is the load borne by the tire with the vehicle stationary on flat ground.

Considering that the variations in pressure within the tire are firstly related to the variations in load borne by the tire and secondly to the variations in temperature of the inflation air, the inventors have been able to dispense with measuring temperature and measure only pressure in order to determine the dynamic loads borne by a tire. The inventors have been able to demonstrate that the frequencies at which the pressure and temperature of the inflation air vary differ according to whether they are due to exchanges of heat with the tire or even the rim or whether they are due to the variations in load caused by the running of the tire.

Specifically, they have been able to demonstrate that the low-frequency variations are due to heating by exchanges of heat with the tire and the rim. The heating of the tire is due to the phenomena of hysteresis of the materials of which it is made and therefore to the stresses placed on these materials during running. The heating of the rim is due to the presence of the braking and transmission devices in the wheel. Given the high thermal inertia of the tire and of the rim, the frequencies associated with the inflation air temperature and pressure variations associated with these phenomena are very well below 1 Hz.

Moreover, they have been able to demonstrate that the pressure variations related to the variations in load, which correspond to compressions of the inflation air upon deflection or alternatively expansion when the cavity of the tire reverts to its initial volume, occur at frequencies generally of the order of 1 to 2 Hz or higher.

According to the invention, the measurement of pressure during the period is used to determine the reference pressure of the tire subjected to a load that is constant and known per time interval. The fact of having revealed the various frequencies has allowed the inventors to conceive of processing the measured signal over the period in question in order to eliminate the effect of the variations in load and thus define, at each point, a reference pressure which evolves as a result of the variations in temperature over the measurement period and therefore corresponds to a use of the tire at constant load.

Next, knowing this reference pressure at each pressure measurement point, it is possible to calculate the variation in pressure between the measured pressure and the determined reference pressure.

Finally, using a model of the tire devised beforehand and that relates a variation in load to a variation in pressure with respect to a known initial state, it is possible to determine the dynamic load borne by the tire.

The average load obtained may differ from the known static load depending on the relationship between the variation in load and the variation in pressure established by way of a model. If that happens, it is necessary to correct the overall reference pressure and iterate the calculation of pressure variations and the computing of the variations in load.

According to one preferred embodiment of the invention, the reference pressure of the same tire subjected to a load that is constant per time interval is determined by adjusting a polynomial on the measured signal for each pressure measurement time interval. Such an embodiment makes it possible simply to dispense with the highest-frequency variations and highlight only the low-frequency pressure variation caused by the variations in temperature originating from the materials of which the tire or the wheel is made. The load that is constant per time interval corresponds to the load borne by the tire when the vehicle is stationary on flat ground, during each of these time intervals.

This load that is constant per time interval is, for example, known by weighings carried out per tire for each of the time intervals or alternatively made accessible by supported-load estimating devices associated with the suspension elements.

According to other embodiments of the invention, the reference pressure of the same tire subjected to a load that is constant can be determined using any other type of signal processing, such as filters.

Advantageously according to the invention, irrespective of the signal processing used, this processing is carried out using a computer and computer programs.

For preference according to the invention, the model of the tire is a system of graphs and/or a numerical model. Beforehand, it is necessary to have devised such a model of the tire which will make it possible to calculate the variation in load borne by the tire corresponding to the variation in pressure determined from the difference between the measured pressure and the corresponding reference pressure under controlled temperature conditions.

These controlled temperature conditions are advantageously obtained with a model based on constant tire and rim temperatures.

Advantageously again according to the invention, the model of the tire is determined on ground similar to that used for measurement, in order notably to make it possible to take account of any deformation of the ground under the tire that might influence the variation in pressure, notably in the case of loose ground.

According to an alternative form of the invention, because the use is cyclic, the vehicle for example being of the dumper type, the measurement period comprises at least in succession an unladen time interval and a time interval of laden running.

According to this alternative form of the invention, knowledge simply of the static load borne by the tire when the vehicle is unladen will make it possible to estimate the load borne by the vehicle throughout the measurement period. Information regarding the load borne by the tire when the vehicle is unladen is communicated by the manufacturer of the vehicle or can be measured by any means known to those skilled in the art.

The reference pressure of the same tire subjected to a load that is constant is determined by adjusting a polynomial on the measured signals for the pressure measurement periods when the vehicle is unladen. Interpolating or extrapolating these signals for the periods of laden running will provide an estimate of a reference pressure for these periods of laden running, corresponding to a load that is constant and equal to the load carried when the vehicle is unladen.

The invention also proposes a method for estimating the load borne by a tire of a vehicle running along over a given period, comprising at least successively an unladen time interval and a time interval of laden running, whereby the pressure is measured during the period, at each pressure measurement point of the unladen phases, the pressure, known as the reference pressure, of the same tire subjected to a constant load is determined, a pressure, known as a reference pressure, is deduced at each pressure measurement point of the phases of laden running of the same tire subjected to a constant load and at each pressure measurement point, the load is calculated from the difference between the measured pressure and the reference pressure and from a model of the tire devised beforehand and that relates a variation in load to a variation in pressure.

As explained previously, the pressure, known as the reference pressure, at each pressure measurement point of the phases of laden running of the same tire subjected to a constant load is advantageously deduced by interpolating or extrapolating the determined signals of the pressure, known as the reference pressure, of the same tire subjected to a constant load in the phases of unladen running.

Figure 2:
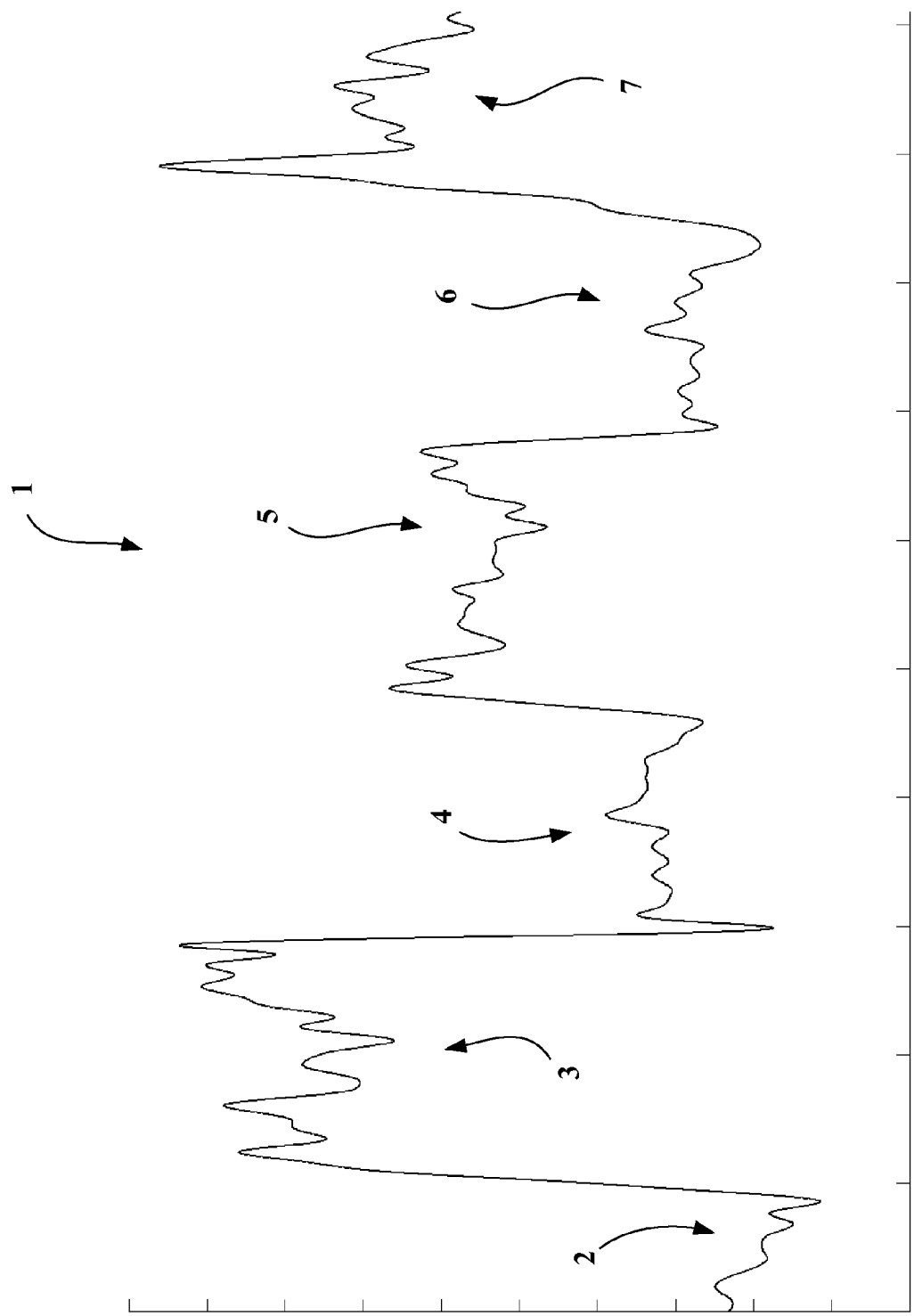
Figure 3:
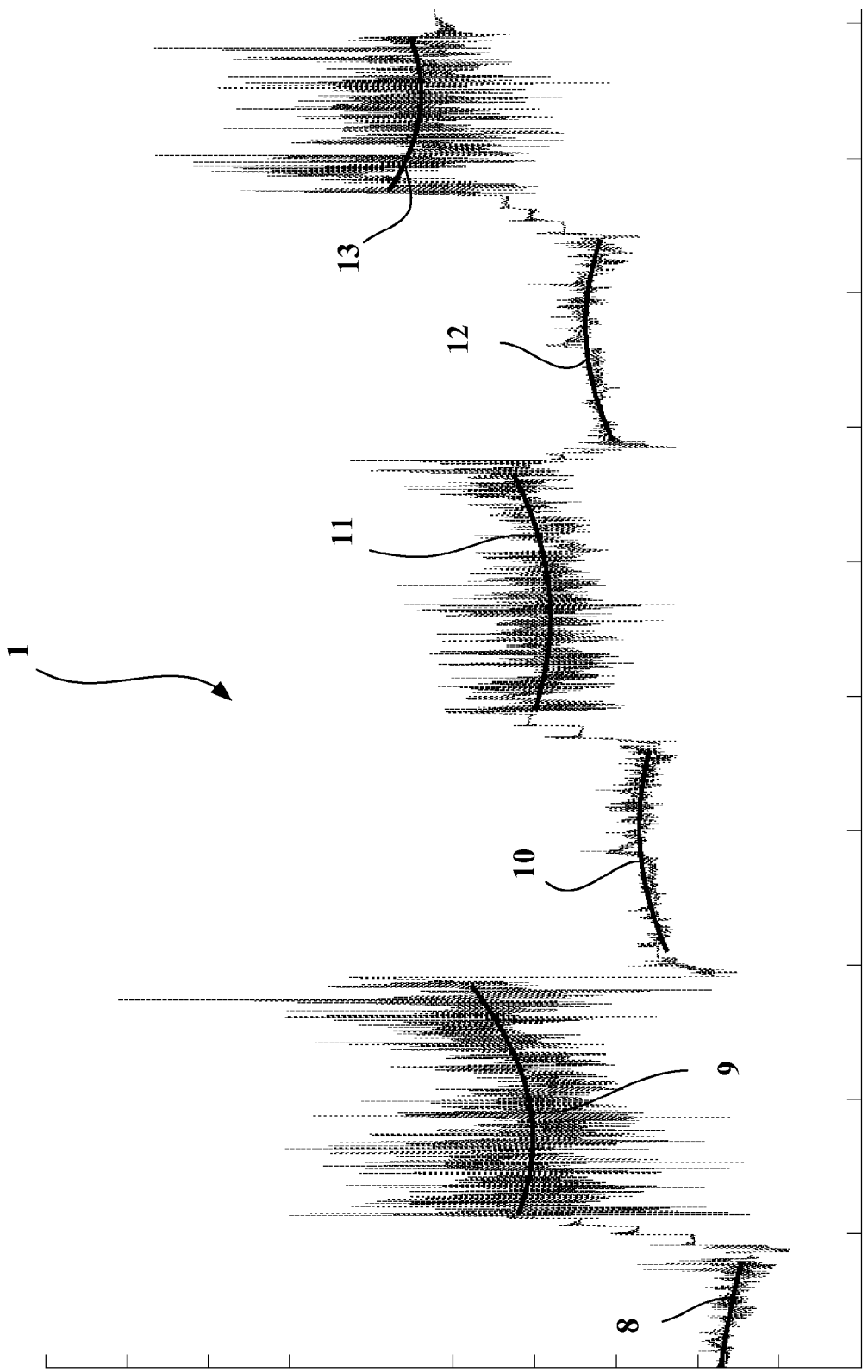
Figure 4:
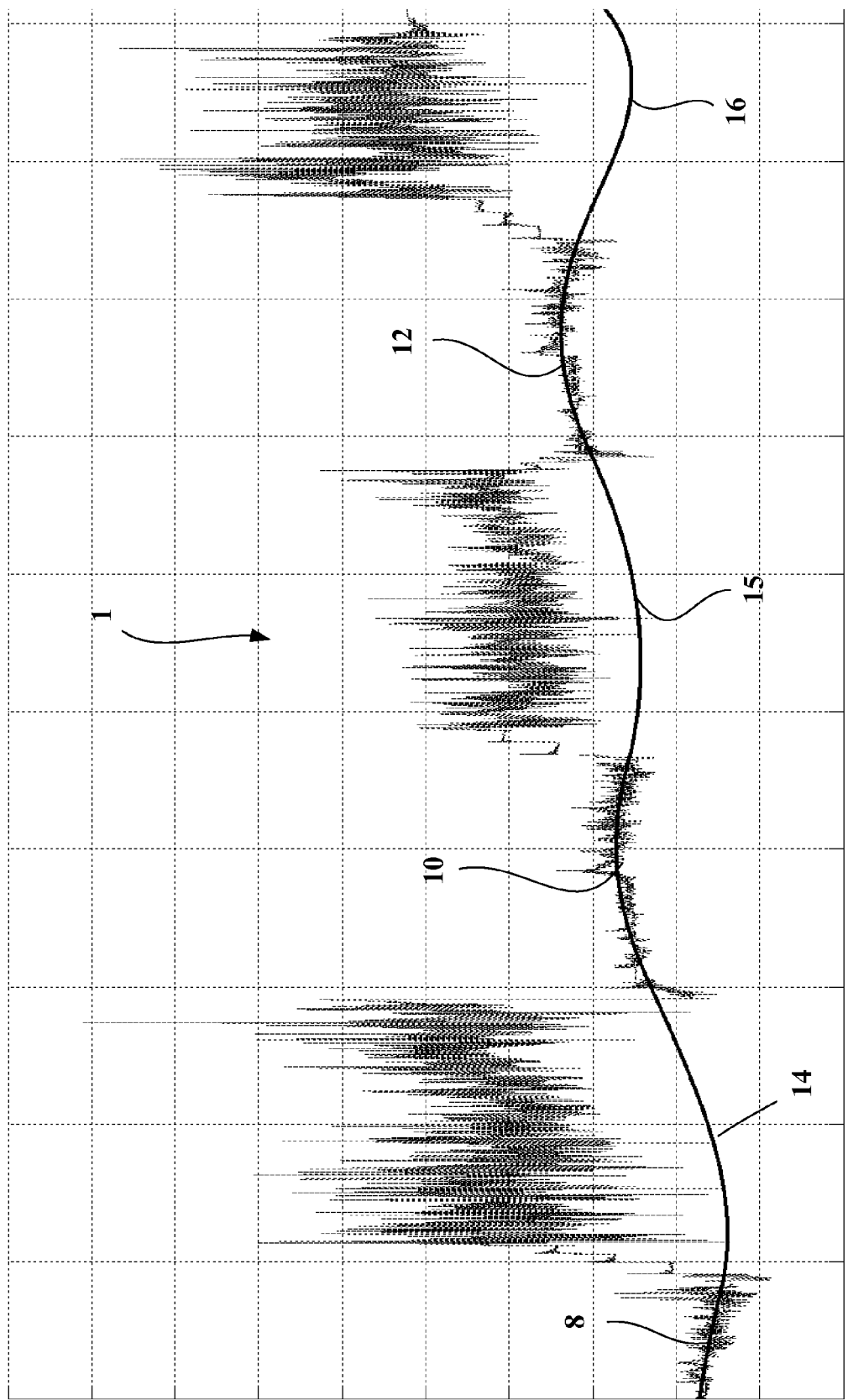
Figure 5:
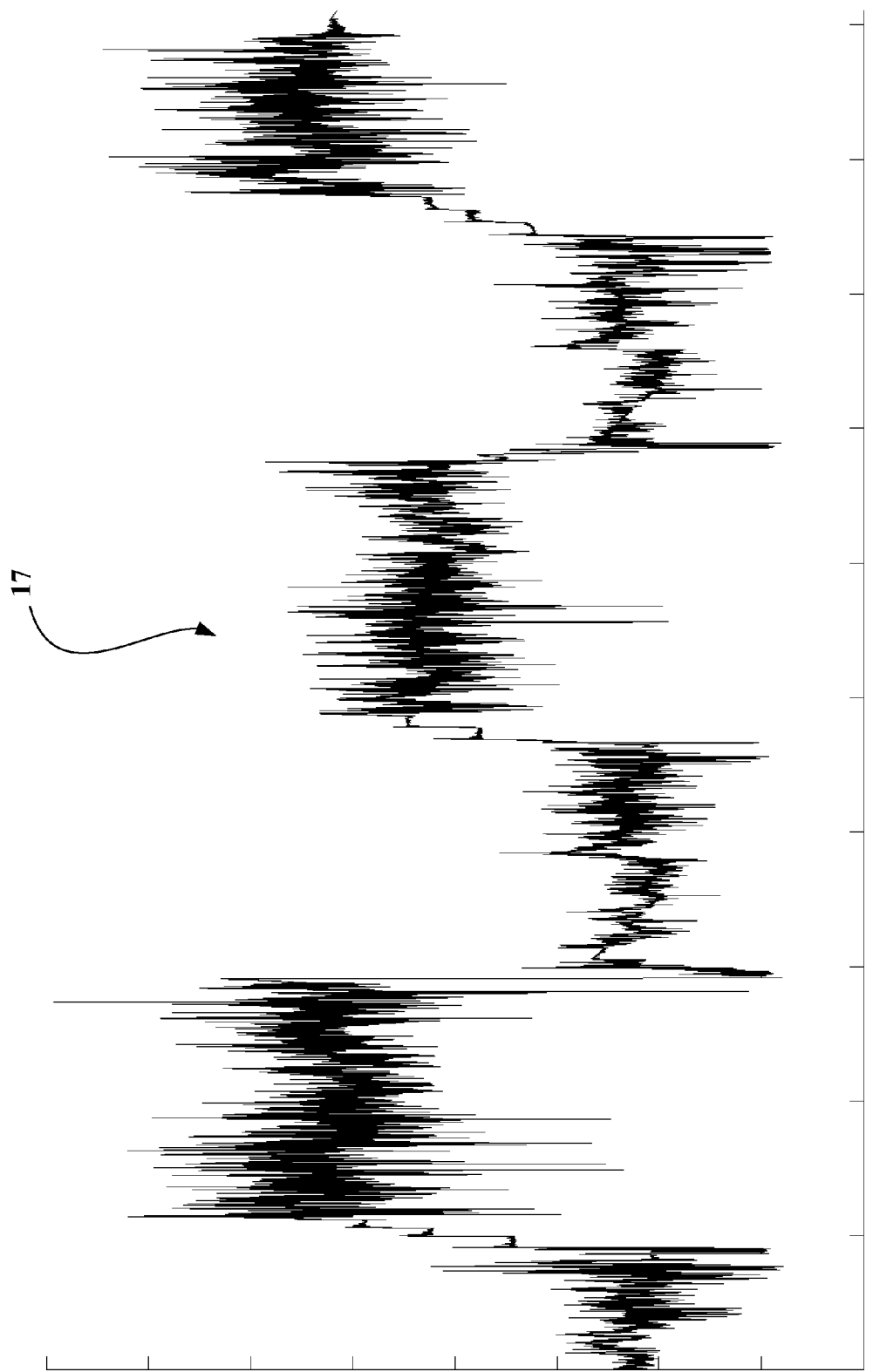

Other advantageous features and details of the invention will become apparent hereinafter from the description of one embodiment of the invention given with reference to FIGS. 1 to 5 which depict:

FIG. 1, an extract of a recording of the inflation pressure of a tire as a function of time, FIG. 2, the result of the processing of the signal of FIG. 1 to separate the phases of laden running and unladen running, FIG. 3, the reference pressure curves superimposed on the signal of FIG. 1 for each of the time intervals corresponding to a known laden state of the vehicle, FIG. 4, the reference curve superimposed on the signal of FIG. 1, corresponding to a load that is constant and equal to the static load when the vehicle is unladen, FIG. 5, a curve giving load measurements as a function of time.

The example described hereinbelow used a dumper of Komatsu 930E type, fitted with six tires of type 53/80R63, running along the tracks of an open cast mine.

Each of the six tires of the vehicle comprises an inflation-pressure sensor. These are sensors mounted on the tire inflation valves.

FIG. 1 represents a graph of the recorded signal 1. It represents a measurement of the tire inflation air pressure as a function of time over a period of three running cycles, one cycle comprising an unladen phase and a phase of laden running.

A first step is to identify the phases corresponding to different states of loading of the vehicle or, more specifically in this instance, the phases during which the vehicle is laden and the phases during which the vehicle is running unladen.

Such a step can be performed by hand by an operator simply by looking at the signal. A quicker method is to automate this step by applying, for example, a band-pass filter. The aim is to eliminate firstly most of the pressure variations that are due to the variations in temperature, using a high-pass filter, and most of the pressure variations that are caused by variations in dynamic load, using a low-pass filter. The periods during which the vehicle is laden then correspond to the periods during which the processed signal is above a given threshold, whereas the periods during which the vehicle is unladen correspond to the periods during which the processed signal is below this threshold. The result of this step is represented in FIG. 2. The zones 2, 4, 6 with the lowest pressure values correspond to phases run of running unladen and the zones 3, 5, 7 with the highest pressure values correspond to phases of laden running.

When the static load borne by the tire is known for each of the phases described hereinabove, for example using weighings, the second step is to determine, for each measurement point of each phase, considered separately, a reference pressure that corresponds to the pressure that the tire would have if subjected to the same variations in temperature and to a load that is constant and equal to the static load.

This second step is performed either by processing of the low-pass filter type in order to eliminate variations related to the dynamics of the vehicle in the zones of unladen running or by a polynomial adjustment to the measured signal for each of these phases. This then gives an estimate of the reference pressures, which are represented in FIG. 3 by curves 8, 9, 10, 11, 12 and 13.

The inventors then propose, in order to enhance the estimate of these reference pressures, eliminating the start and end of each of these phases in order not to take into consideration the times corresponding to the periods of loading and of unloading.

When only the static load corresponding to the unladen vehicle is taken into consideration, the second step in the signal processing is, starting out again from the measurement signal and, having according to the first step chronologically situated the various phases during which the vehicle is laden and the phases during which the vehicle is running unladen, to determine for each measurement point of the phases of unladen running, a reference pressure that corresponds to the pressure that the tire would have if subjected to the same variations in temperature but to a load that is constant and equal to that that it bears when the vehicle is unladen.

As before, this second step is performed either by processing of the low-pass filter type in order to eliminate variations related to the dynamics of the vehicle in the zones of unladen running or by a polynomial adjustment to the signal measured for these zones. This then gives an estimate of the reference pressure, represented in FIG. 4 by curve portions 8, 10, 12, of each of the zones 2, 4, 6 that correspond to the unladen phases.

As before, in order to enhance their estimate of these reference pressures, the inventors propose to eliminate the start and end of each of these unladen zones in order not to take into account the times corresponding to the loading and unloading periods.

Still in the case where only the static load corresponding to the unladen vehicle is taken into consideration, a third step is to interpolate or extrapolate the curves obtained in the unladen zones in order to estimate the reference pressure in the zones of laden running. The inventors propose to perform polynomial interpolations between each of the curves obtained in the zones of unladen running. That leads to curve portions 14, 15, 16.

In all events, during the next step, it is possible at each of the measurement points to calculate the difference between the measured pressure and the reference pressure.

The pressure variation thus obtained is converted into a variation in load using a model defined beforehand.

FIG. 5 using curve 17 illustrates the tire load thus obtained as a function of time.

In accordance with the foregoing, such an estimate of the load borne by the tires fitted to a dumper will provide a better understanding of the origin of some of the types of damage and allow tire design to be adapted better to suit the uses to which the tires are put.

This information regarding the load borne by a tire can also bring other advantages. For example, it is possible to offer the user, which means the driver of the vehicle, advice notably getting him to correct his style of driving in certain circumstances in order to reduce the variations in load on certain tires at certain points along the tracks along which he is driving. For example, recommending slowing down in a zone where that might not appear necessary may make it possible to reduce the intensity of subsequent braking and thereby the induced transfer of load to the tires of the front axle assembly of the vehicle, or indeed oscillations. Such a correction to driving style may thus make it possible to avoid the tires having to withstand excessive loadings that could potentially lead to tire damage. For such an application, it is advantageous for the reference pressure and the load to be calculated in real time.

It is also possible to provide information regarding tire temperatures. Indeed, knowledge of the loads borne by the various tires, combined with a measurement of the speed, gives access to the TKPH (Tonne.Kilometer per hour) of each of the tires.

Aside from information regarding the tire, this information regarding the load borne by a tire can also make it possible to determine the overall load carried by the vehicle.

It is even possible to use this information regarding the load borne by each of the tires to improve the route or upkeep of the tracks where the dynamic loads are considered to be too great.

The invention claimed is:

1. A method for estimating the dynamic load borne by a tire of a vehicle running along over a given period, wherein the measurement period comprises at least in succession an unladen time interval and a time interval of laden running, wherein the pressure is measured during the period, wherein, at least pressure measurement point, the pressure, known as the reference pressure, of the same tire subjected to a load that is constant and known per time interval is determined, and wherein, at each pressure measurement point, the variation in load is calculated from the difference between the measured pressure and the reference pressure and from a model of the tire devised beforehand and that relates a variation in load to a variation in pressure.

2. The method according to claim 1, wherein the reference pressure of the same tire subjected to a load that is constant per time interval is determined by adjusting a polynomial on the measured signal for each pressure measurement time interval.

3. The method according to claim 1, wherein the model of the tire is a system of graphs and/or a numerical model.

4. The method according to claim 1, wherein the reference pressure of the same tire subjected to a load that is constant is determined by adjusting a polynomial on the measured signals for the pressure measurement periods when the vehicle is unladen, and by interpolating or extrapolating these signals for the periods of laden running.

5. A method for estimating the load borne by a tire of a vehicle running along over a given period, comprising at least successively an unladen time interval and a time interval of laden running, wherein the pressure is measured during the period, wherein, at each pressure measurement point of the unladen phases, the pressure, known as the reference pressure, of the same tire subjected to a constant load is determined, wherein a pressure, known as a reference pressure, is deduced at each pressure measurement point of the phases of laden running of the same tire subjected to a constant load and wherein, at each pressure measurement point, the load is calculated from the difference between the measured pressure and the reference pressure and from a model of the tire devised beforehand and that relates a variation in load to a variation in pressure.

6. The method according to claim 5, wherein the pressure, known as the reference pressure, at each pressure measurement point of the phases of laden running of the same tire subjected to a constant load is deduced by interpolating or extrapolating the determined signals of the pressure, known as the reference pressure, of the same tire subjected to a constant load in the phases of unladen running, flanking the phase of laden running.

* * * * *